US008899823B2

(12) United States Patent  (10) Patent No.: US 8,899,823 B2
Oldham  (45) Date of Patent: Dec. 2, 2014

(54) GEL HYDRATION UNIT

(75) Inventor: Don Oldham, Midland, TX (US)

(73) Assignee: Advanced Stimulation Technology, Inc., Midland, TX (US)

( * ) Notice: Subject to any disclaimer, the term of this patent is extended or adjusted under 35 U.S.C. 154(b) by 538 days.

(21) Appl. No.: 13/316,159

(22) Filed: Dec. 9, 2011

(65) Prior Publication Data

US 2013/0150268 A1 Jun. 13, 2013

(51) Int. Cl.
*B01F 5/10* (2006.01)

(52) U.S. Cl.
USPC ............... 366/136; 366/173.2; 366/181.6

(58) Field of Classification Search
CPC ............ B01F 5/10; B01F 5/102; B01F 5/106
USPC ......... 366/16–20, 152.1, 152.2, 153.1, 152.6, 366/160.1–160.3, 162.1, 182.1, 173.1, 366/173.2, 181.6, 136, 137; 137/3, 88, 91
See application file for complete search history.

(56) References Cited

U.S. PATENT DOCUMENTS

| 4,828,034 | A | | 5/1989 | Constien et al. | |
|---|---|---|---|---|---|
| 5,046,856 | A | * | 9/1991 | McIntire | 366/291 |
| 5,052,486 | A | * | 10/1991 | Wilson | 166/308.4 |
| 5,103,908 | A | * | 4/1992 | Allen | 166/285 |
| 5,114,239 | A | * | 5/1992 | Allen | 366/6 |
| 5,863,119 | A | * | 1/1999 | Yergovich et al. | 366/137 |
| 6,217,207 | B1 | * | 4/2001 | Streich et al. | 366/137 |
| 6,817,376 | B2 | * | 11/2004 | Morgan et al. | 137/14 |
| 6,854,874 | B2 | * | 2/2005 | Graham, Sr. | 366/173.1 |
| 7,125,162 | B2 | * | 10/2006 | Graham, Sr. | 366/173.1 |
| 7,284,898 | B2 | * | 10/2007 | Duell et al. | 366/152.1 |
| 7,308,379 | B2 | * | 12/2007 | Dykstra et al. | 702/127 |
| 7,353,874 | B2 | * | 4/2008 | Dykstra et al. | 166/305.1 |
| 7,494,263 | B2 | * | 2/2009 | Dykstra et al. | 366/17 |
| 7,497,263 | B2 | * | 3/2009 | Parris et al. | 166/308.5 |
| 7,543,645 | B2 | * | 6/2009 | Dykstra et al. | 166/305.1 |
| 7,561,943 | B2 | * | 7/2009 | Dykstra et al. | 700/265 |
| 7,567,856 | B2 | * | 7/2009 | Dykstra et al. | 700/265 |
| 7,581,872 | B2 | * | 9/2009 | Allen | 366/134 |
| 7,794,135 | B2 | * | 9/2010 | El Kholy et al. | 366/163.2 |
| 7,866,881 | B2 | * | 1/2011 | El Kholy et al. | 366/348 |
| 8,177,411 | B2 | * | 5/2012 | Borgstadt | 366/15 |
| 8,444,312 | B2 | * | 5/2013 | Hagan et al. | 366/141 |
| 8,641,266 | B2 | * | 2/2014 | McIntire | 366/291 |
| 2003/0008780 | A1 | | 1/2003 | Chowdhary et al. | |
| 2003/0161211 | A1 | * | 8/2003 | Duell et al. | 366/8 |
| 2004/0081015 | A1 | * | 4/2004 | Graham, Sr. | 366/173.1 |
| 2005/0135185 | A1 | * | 6/2005 | Duell et al. | 366/8 |
| 2005/0201197 | A1 | * | 9/2005 | Duell et al. | 366/136 |
| 2006/0231259 | A1 | * | 10/2006 | Dykstra et al. | 166/305.1 |
| 2006/0233039 | A1 | * | 10/2006 | Dykstra et al. | 366/8 |
| 2006/0235627 | A1 | * | 10/2006 | Dykstra et al. | 702/23 |
| 2007/0153622 | A1 | * | 7/2007 | Dykstra et al. | 366/8 |
| 2007/0153623 | A1 | * | 7/2007 | Dykstra et al. | 366/8 |
| 2007/0153624 | A1 | * | 7/2007 | Dykstra et al. | 366/19 |
| 2007/0171765 | A1 | * | 7/2007 | Dykstra et al. | 366/19 |
| 2009/0323464 | A1 | * | 12/2009 | McIntire | 366/168.1 |
| 2013/0142006 | A1 | * | 6/2013 | Saffioti | 366/153.3 |
| 2013/0150268 | A1 | * | 6/2013 | Oldham | 507/215 |

FOREIGN PATENT DOCUMENTS

GB 1450612 A * 9/1976

* cited by examiner

*Primary Examiner* — Charles Cooley
(74) *Attorney, Agent, or Firm* — Howison & Arnott, LLP (57) ABSTRACT

A fracking fluid hydration unit is provided that has a plurality of hydration tank sections wherein shear is added to the hydrated fluid flow via a recirculation hydrated fluid jetting system.

20 Claims, 9 Drawing Sheets

SIDE VIEW

FIG. 5
SIDE VIEW

FIG. 6
TOP VIEW

GEL HYDRATION UNIT

TECHNICAL FIELD

Embodiments of the present invention relate to methods and apparatus that hydrate gel fracturing fluids for use in down-hole fracturing operations. More specifically, an exemplary gel hydration system hydrates fracturing fluids on-the-fly as it is required for fracturing operations.

BACKGROUND

It has become common practice to pump a viscous fluid at high pressures down into a wellbore to crack the formation and force fracturing fluid into created cracks in order to enhance or increase the production of oil and gas hydrocarbons from wells bored into subterranean formations. The fracturing fluid is also commonly used to carry sand and other types of particles, called proppants, to hold the cracks open when the pressure is relieved. The cracks, held open by the proppants, provide additional paths for the oil or gas to reach the wellbore, which increases production from the well. This process is commonly called hydraulic fracturing or "fracking".

A hydration unit is generally used for the hydration of fracturing fluids or hydrated fluids originating from a very viscous fracturing fluid slurry concentrate (gel) that is mixed with water in preparation for transfer to a blender unit prior to being pumped under pressure down-hole. The fracturing fluid slurry concentrate (gel) is used in a continuous hydration process in a hydration unit so as to produce hydrated fluid as needed or "on-the-fly" for the hydraulic fracturing process. Typically a gel may comprise a polymer slurry wherein a hydratable polymer is dispersed in a hydrophobic solvent (herein after referred to as an "oil based fluid") in combination with a suspension agent and a surfactant with or without other optional additives commonly employed in well treatment applications. Because of the inherent dispersion of the hydratable polymer in an oil based fluid (i.e., the lack of affinity for each other), such a polymer slurry or polymer phase gel tends to not lump or hydrate prematurely prior to dispersion, injection or being added into water. However, the rate of polymer hydration within the gel is a critical factor particularly in continuous mix or hydration unit applications wherein the necessary hydration and associated viscosity rise must take place over a relatively short time span that corresponds to a minimum residence time of the fluids within a hydration unit during the continuous mix procedure.

In such applications, hydration is the process by which a hydratable polymer absorbs water. When the polymer is dispersed in water, its ability to absorb water dictates hydration or its hydration rate. There are several factors that determine how readily a polymer will hydrate or develop viscosity. Such factors include the pH of the system, the amount of mechanical shear applied in the initial mixing phase, the concentration of salts and the concentration of the polymer. The hydration rate can be influenced through pH control agents, which may be blended with the polymer in the gel or added to an aqueous medium. The hydration rate can also be controlled by the level of applied shear, wherein the gel-water solution's viscosity increases faster when the hydratable polymer is subjected to high amounts of shear. Fluid viscosity increases may also be influenced (particularly in low shear applications) by the salts present in the solution. The higher the salt content in the solution, the more retarded the hydration process. The extent of viscosity retardation is dependant on the concentration and the type of salt. Finally, the viscosity level achieved at a particular point in time is a function of the overall hydratable polymer concentration.

Various natural hydratable polymers are used in a polymer phase gel. In particular, modified guar works very well and develops viscosity in all electrolyte or salt bearing systems which contain such salts as KCl, NaCl, and $CaCl_2$ concentrations. Guar gum hydrates and develops viscosity very efficiently in a pH range of 7-8 yielding viscosities of 32 to 36 cps in 2% solution of KCl. Hydroxypropyl guar (HPG) hydrates well in many salt systems at 80° F. and also develops excellent viscosity at temperatures around 40° F. Carboxymethyl hydroxypropyl guar (CMHPG) hydrates in most electrolyte make-up solutions, however, it's more sensitive to such salted electrolyte solutions than unmodified guar and HPG. CMHPG hydrates well in both cold and warm water.

In contrast to the above natural polymers, synthetic polymers may also be dispersed and hydrated, however they may not be as sensitive to pH effects. Consequently hydration and dispersion of such synthetic polymers will mainly rely more on the mixing shear applied to the aqueous medium in a hydration unit.

Generally, prior hydration units that accept a polymer phase gel and water mixture so as to produce a hydrated fluid as part of a continuous preparation of fracturing fluids have focused primarily on mechanical mechanism movement or paddle based mixing processes within a hydration unit. The paddle based mixing process requires a large mechanical paddle or beater structure that is rotatably mounted within a hydration unit. The paddle structure is mechanically rotated on bearings and driven via, for example, a chain or shaft drive, which is mechanically attached and driven by a hydraulic, electric or combustion powered drive train and/or transmission. Mechanical failure of any part of the drive train, chain links and/or bearings can shut down the hydration unit, which is expensive and time consuming to repair. Furthermore, significant torque and horse power is required to rotate the mechanical paddles at the speeds necessary for producing shear forces that increase the hydration rate of the hydratable polymer and establish the needed hydrated fluid viscosity at the hydration unit output by such a mechanical paddle or beater based system.

What is needed is a hydration unit that can provide suitable amounts of shear on a polymer phase gel and water mixture in order to sufficiently increase the hydration rate of the mixture during its residence time within the hydration unit. Furthermore, what is needed is a hydration unit that requires fewer moving parts such as paddles, bearings, chains and the like that are subject to wear and breakage resulting in extended down time to repair the hydration unit.

SUMMARY

In order to overcome the drawbacks of prior hydration units used to create hydrated fluid or fracking fluid in the oil exploration industry, embodiments of the invention provide a hydration unit that utilizes high pressure recirculation jetting of the polymer phase gel and water mixture (hydrated fluid) so as to create high shear forces in the mixture of hydrated fluid as it moves through and/or is recirculated in an exemplary hydration unit so as to accelerate the hydration process.

In an embodiment of the invention a method for rapid hydration of a polymer phase gel is provided wherein the polymer phase gel is injected into a water stream to create a mixture. The mixture is then pumped through a suction pump and a first static mixer into a first tank section of a fluid tank having N adjacent tank sections. The polymer phase gel and water mixture are allowed to mix so that the hydratable polymer contained in the polymer phase gel and the water become a hydrated fluid while moving from the first tank section to the Nth tank section through at least N−1 tank sections. Hydrated fluid from the Nth tank section is also recirculated by being pumped through a mixing pump and a second static mixer into a jetting system. Using the jetting system, the hydrated fluid is jetted into at least one or more of the N tank sections via a plurality of jet openings so as to create sufficient shear in the hydration fluid within the at least one or more tank sections in order to increase the hydration rate of the hydration fluid. After the hydration fluid is hydrated to a determined or acceptable viscosity, the hydrated fluid is then extracted from the Nth tank section and provided to another stage, such as a blender unit, in a fracking processes.

In another embodiment of the invention a hydration unit is provided. The hydration unit comprises a tank that is adapted to contain hydrated fluid. The tank comprises adjacent first through N tank sections. Each tank section comprises a fluid inlet area and a fluid exit area such that the hydrated fluid moves from the first to the Nth tank section in substantially a serpentine or back and forth pattern. A hydrated fluid return pipe that is adapted to carry hydrated fluid to be recirculated out of the Nth tank section is positioned with an inlet in the Nth tank section. A mixing pump draws hydrated fluid from the Nth tank section through the hydrated fluid return pipe to provide the recirculated hydrated fluid at a mixing pump output. A static mixer receives the recirculated hydrated fluid from the mixing pump output and further mixes and adds shear to the hydrated fluid as it flows therethrough. A jetting system receives the recirculated hydrated fluid from an output of the static mixer. The jetting system comprises a jet tube manifold having M outputs. A first jet tube is removably attached to a first of the M manifold outputs and extends into the first of the N tank sections. The first jet tube comprises a first configuration of jet outputs adapted to jet the hydrated fluid flowing therethrough in a plurality of directions and at a plurality of depths within the first tank section. Furthermore, an exemplary hydration unit comprises a hydration fluid outlet that is adapted to allow hydrated fluid to exit the tank. The hydrated fluid outlet may include a valve to selectively adjust a flow of the hydrated fluid exiting the tank.

Additionally, the hydration unit may further comprise a water input section that is adapted to accept water from at least one water source and provide the water into a water flow path. A polymer phase gel input valve section is provided to accept a measured flow of polymer phase gel and provide the flow of polymer phase gel into the water flow path to create a mixture of polymer phase gel and water. A suction pump receives a mixture of polymer phase gel and water and pumps the mixture into the first tank section as hydrated fluid. Between the suction pump and the first tank section, a static mixer is positioned to statically mix the moving mixture of hydrated fluid after leaving the suction pump but prior to being input into a first input section of the first tank section of the hydration unit tank.

BRIEF DESCRIPTION OF THE DRAWINGS

Other objects, features, and characteristics of the invention as well as methods of operation and functions of related elements of structure, and the combination of parts and economics of manufacture, will become apparent upon consideration of the following description and appended claims with reference to the accompanying drawings, all of which form a part of this specification wherein like reference numerals designate corresponding parts in the various figures, and wherein:

DETAILED DESCRIPTION

Referring now to the drawings, wherein like reference numbers are used herein to designate like elements throughout, the various views and embodiments of gel hydration unit are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

The following description, which includes disclosure of various embodiments, is merely exemplary in nature and is in no way intended to limit the invention, its application or uses. As used herein, a gallon is a unit of volume equivalent to about 3.8. A barrel contains 42 US gallons or about 160 liters.

The rapid hydration of a water soluble polymer dispersed in a hydrophobic solvent (the combination referred to as a "polymer phase gel") after being injected into a stream of water, the mixture of which being pumped into an exemplary hydration unit is performed, at least in part, by an overall mixing intensity that causes shear stresses within the fluid flow of the exemplary hydration unit. The mixing intensity and agitation is performed at least in part by the jetting of the hydration fluid into a plurality of tank sections filled with the mixture of polymer phase gel and water that is hydrating and referred to as hydrated fluid which is in various stages of hydration and viscosity thicknesses. A commercial process according to embodiments of the present invention achieves a fast enhanced polymer hydration by utilizing a sequence of exemplary mixing steps.

By definition, a fluid is a material continuum that is unable to withstand a static shear stress. Unlike an elastic solid, which responds to shear stress with a recoverable deformation, a fluid responds to shear with an unrecoverable flow. Shear rate is the ratio of change of velocity at which one layer of fluid passes over an adjacent layer. As such, the greater the ratio of the velocity change between layers of fluid, the higher the shear rate and the greater the shear stresses or forces available to increase the hydration rate of the hydratable fluid.

According to the embodiments of the invention a pumpable, high concentration polymer slurry can be continuously mixed with an appropriate water solution so as to produce a desired viscosity rise on a real time basis, resulting in a hydrated fluid for use in, among other things, hydraulic fracturing. Generally, an improved method or device in accordance with embodiments of the present invention can be employed in conjunction with any high concentration polymer slurry comprising a hydratable polymer dispersed in a hydrophobic solvent. Typically such a polymer slurry or polymer phase gel is made up of at least two ingredients; namely a hydratable polymer and a hydrophobic solvent base. Additionally, a polymer phase gel used in embodiments of the invention may further comprise a suspension agent and a surfactant. An exemplary polymer phase gel is pumpable because it does not become more viscous over a wide temperature range and has no separation and exhibits minimal packing over periods of time, in excess of a week or more.

The polymer phase gel or high concentration polymer slurry is sometimes referred to as gel, fracturing fluid concentrate, water soluble polymer phase dispersed in a hydrophobic solvent and/or by other trade names or trade jargon. Furthermore, although the behavior of the polymer phase gel used in exemplary embodiments is not to be viewed as being dependant on any single explanation or theory, and as such any proposed explanation is not to be interpreted as unduly limiting. As such, an exemplary polymer phase gel has the basic attributes of being a hydratable, stable, pumpable, high concentration polymer phase gel or slurry comprising a hydratable polymer dispersed in a hydrophobic fluid.

The dispersion of hydrophilic, hydratable polymer, which in an aqueous medium would inherently result in a build-up of viscosity, but when in a hydrophobic environment results in a minimum viscosity rise. Consequently, the polymer phase gel concentrate that may be used in embodiments of the invention remains readily pumpable and builds viscosity only when added and mixed with water, aqueous brine or the like. The hydrophobic solvent or oil based fluid can be selected from the group consisting of any of the non-volatile aliphatic and aromatic hydrocarbons and mixtures thereof as generally known in the art. This would include by way of example, but not limited thereto kerosene, mineral oil, crude oil, crude oil distillates, vegetable oil, mineral oil, silicon oils, halogenated solvents, ester alcohols, primary/secondary/or tertiary alcohols of 6-12 carbons, glycol ethers, glycols, animal oils and turpentine. Diesel fuel is often employed as the hydrophobic solvent base in an exemplary polymer phase gel.

The hydratable polymer of an exemplary polymer phase gel that may be used in an exemplary embodiment may be essentially any polymer or mixture of polymers as generally known in the art which yield viscosity (i.e., produce a viscosity rise) upon hydration. Thus, the polymers useful in embodiments of the invention include, by way of example but not limited to, any natural or synthetic polymers including polysaccharides and related polymeric materials such as guar, hydroxypropyl guar (HPG), carboxymethyl hydroxypropyl guar, carboxymethyl hydroxyethyl cellulose, other cellulosics and cellulosic derivatives, polyacrylamides, and similar biopolymers and mixtures thereof. The hydrated polymer that is often used in embodiments of the invention is guar or guar derivatives.

Figure 1:
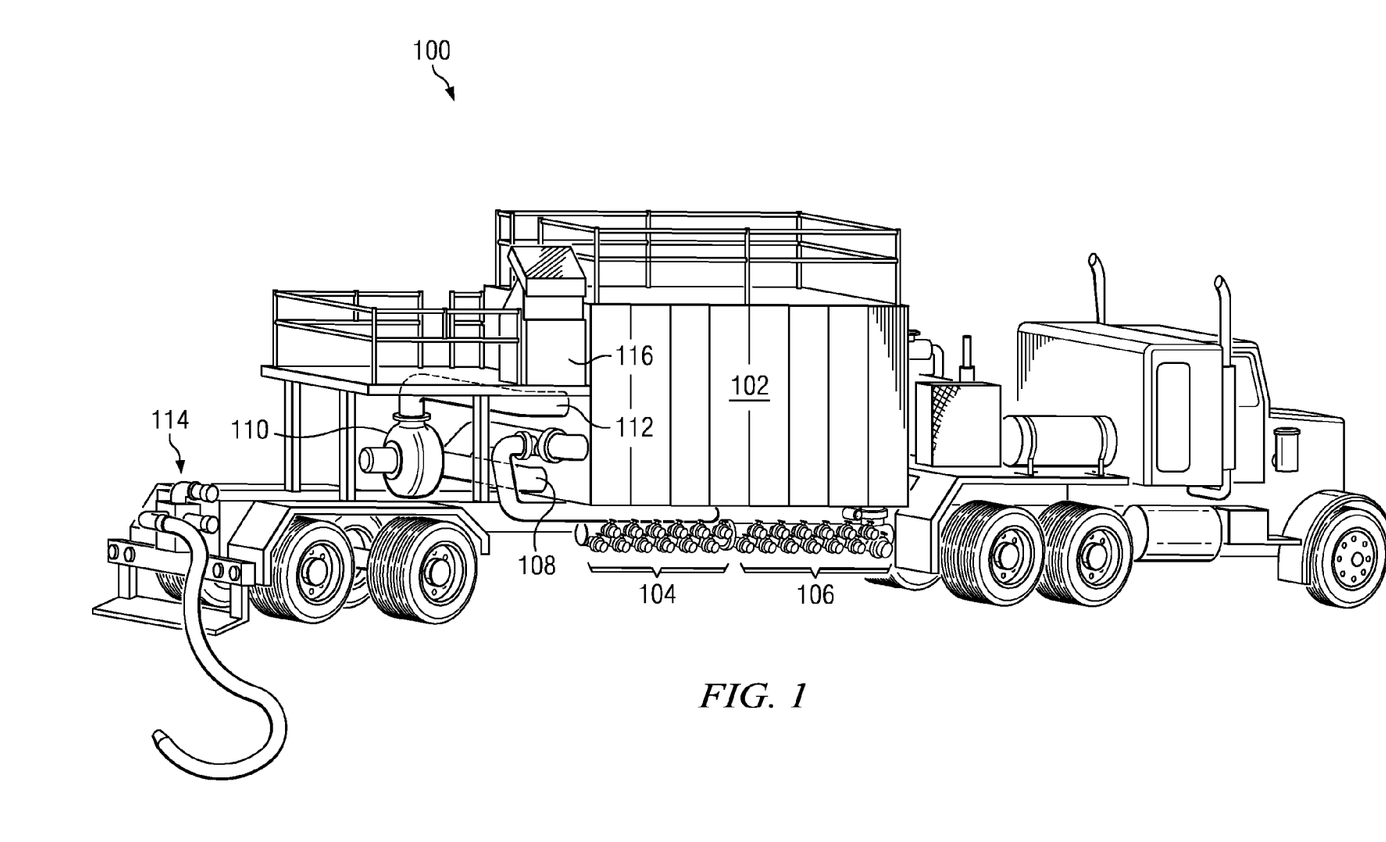
FIG. 1 is a first side view of an exemplary embodiment of a hydration unit installed on a trailer.

Referring now to FIG. 1, a first side view of an exemplary hydration unit mounted on a tractor trailer's trailer is depicted. In this view of an exemplary gel hydration unit 100 the exterior of the hydration tank 102 is shown. The hydration tank 102 can have varying fluid capacities depending on the overall capacity required of an exemplary gel hydration unit. In the embodiment shown, the hydration tank can hold about 190 bbl or about 7980 gallons of fluid. Below the tank 102 is a manifold having a plurality of valves. In this embodiment, on a left side there are twelve water input valves 104, which is where multiple hoses can connect to provide an ample water flow into an exemplary hydration gel unit 100. The plurality of water input valves 104 are separated from the right hand side of the manifold wherein there are 13 hydrated fluid output valves 106. The output valves 106 and input valves 104 are separated by a divider valve (not clearly shown in this drawing), which can be opened or closed to alter the functionality of some or all of the input valves 104 and output valves 106. Furthermore, each input valve 104 and output valve 106 can be manually opened and closed by a machine operator.

In FIG. 1, an external portion of a hydrated fluid return pipe 108 is shown. The hydrated fluid return pipe 108 draws hydrated fluid or partially hydrated fluid from one or more areas within the tank 102 to provide the hydrated or partially hydrated fluid to a mixing pump 110. The mixing pump 110 is a centrifugal pump, which in this embodiment is adapted to pump up to about 140 bbl/min. The mixing pump 110 pumps the hydrated or partially hydrated fluid into the return pipe 112 which is shown to return back into the interior of the hydration tank 102. Although it cannot be seen in this figure, inside the return pipe 112 is a static mixer that is made of a plurality of plates adapted to spin and swirl the fluid within the return pipe 112 adding additional shear prior to it being returned to the interior of the hydration tank 102.

In this view of an exemplary embodiment the polymer phase gel pumps 114 are shown mounted on the back end of the trailer. The polymer phase gel pumps 104 pump the polymer phase gel from a polymer phase gel container, through a hose, a gel input valve and gel input jet (not specifically shown in this figure). A control panel 116 is shown mounted on an upper portion of the overall hydration gel unit 100. The control panel 116 could be placed substantially anywhere about the hydration gel unit. The control panel 116 is used by a machine operator to set and monitor valve positions, pressures, fluid flow rates, temperatures, viscosities, pump RPM, and fluid levels of the various components that make up the overall hydration gel unit 100. The control panel 116 can be used by a machine operator to display all the temperatures, pressures and rates of the chemical pumps, gel pumps, suction pump, mixing pump, gel pumps and hydraulic pumps. The control panel can start and stop the one or more engines that produce the electricity, air pressure, hydraulic pressure and other means for controlling the various components of an exemplary hydration gel unit 100. The control panel 116 also enables the machine operator to set the desired output viscosity of the hydration fluid that is to be output via the output valves.

Figure 2:
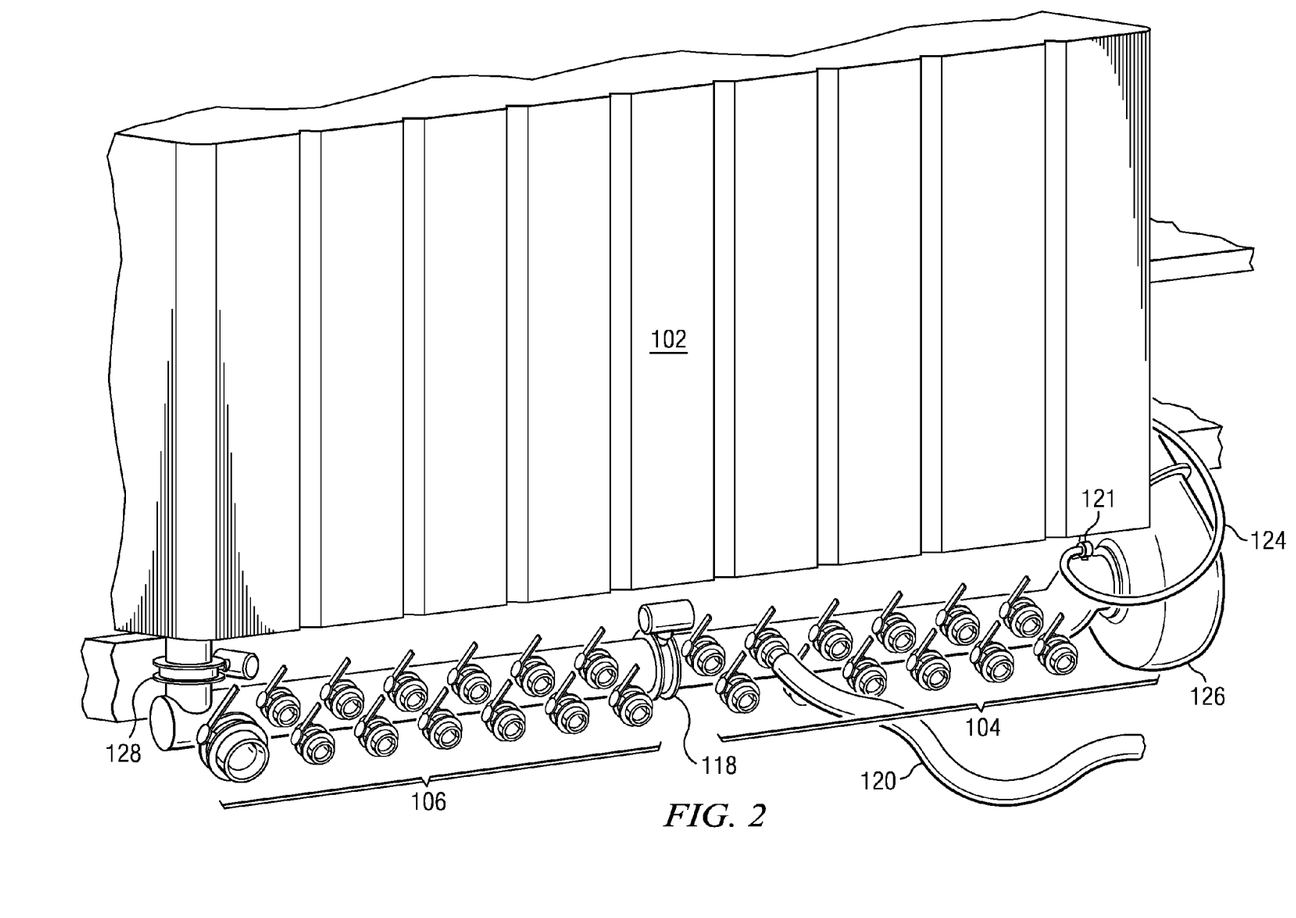
FIG. 2 is a second side view of an exemplary embodiment of a hydration unit installed on a trailer.

Referring now to FIG. 2, a second side view (the other side) of an exemplary hydration gel unit is shown. Here the other side of the hydration tank 102 can be seen with a similar set of input valves and output valves located on the input/output manifold below the hydration tank 102. Here the separation valve 118 (which cannot be easily seen in FIG. 1) is depicted between the input water valves 104 and the output hydrated fluid valves 106.

The input valves 106, as discussed above, receive a plurality of hoses 120 wherein water flows into the input valves and forms a single stream in the manifold thereunder. Downstream from the input valves 104 are the gel input valves 121 wherein gel is pumped via gel hose 124 from the polymer phase gel pumps 114. Each gel input valve 121 can be adjusted via the control panel 116 so as to allow a determined amount of polymer phase gel to be injected into the water stream therein. A suction pump 126, which may be similar if not identical to the mixing pump 110, is a centrifugal pump that sucks water from the plurality of input valves 104 and sucks the polymer phase gel from the gel injection area creating a mixture. The mixture's first encounter is the suction pump's impeller, which adds shear forces to the fluid mixture as it goes through the centrifugal suction pump 126. The centrifugal pump 126 pumps the water/gel mixture into a mixture input area (not specifically shown) inside the hydration tank 102. Still referring to FIG. 2, a hydration tank output valve 128, located proximate to the bottom of the hydration tank 102, can be opened via the control panel 116 so as to allow hydrated fluid to flow into the output manifold and be output via one or more output valves 106 into a plurality hoses. The hydrated fluid that is extracted or output from an exemplary hydration gel unit 100 may be provided to a blender unit that further prepares the hydrated fluid or fracking fluid for insertion into a wellhead.

Figure 3:
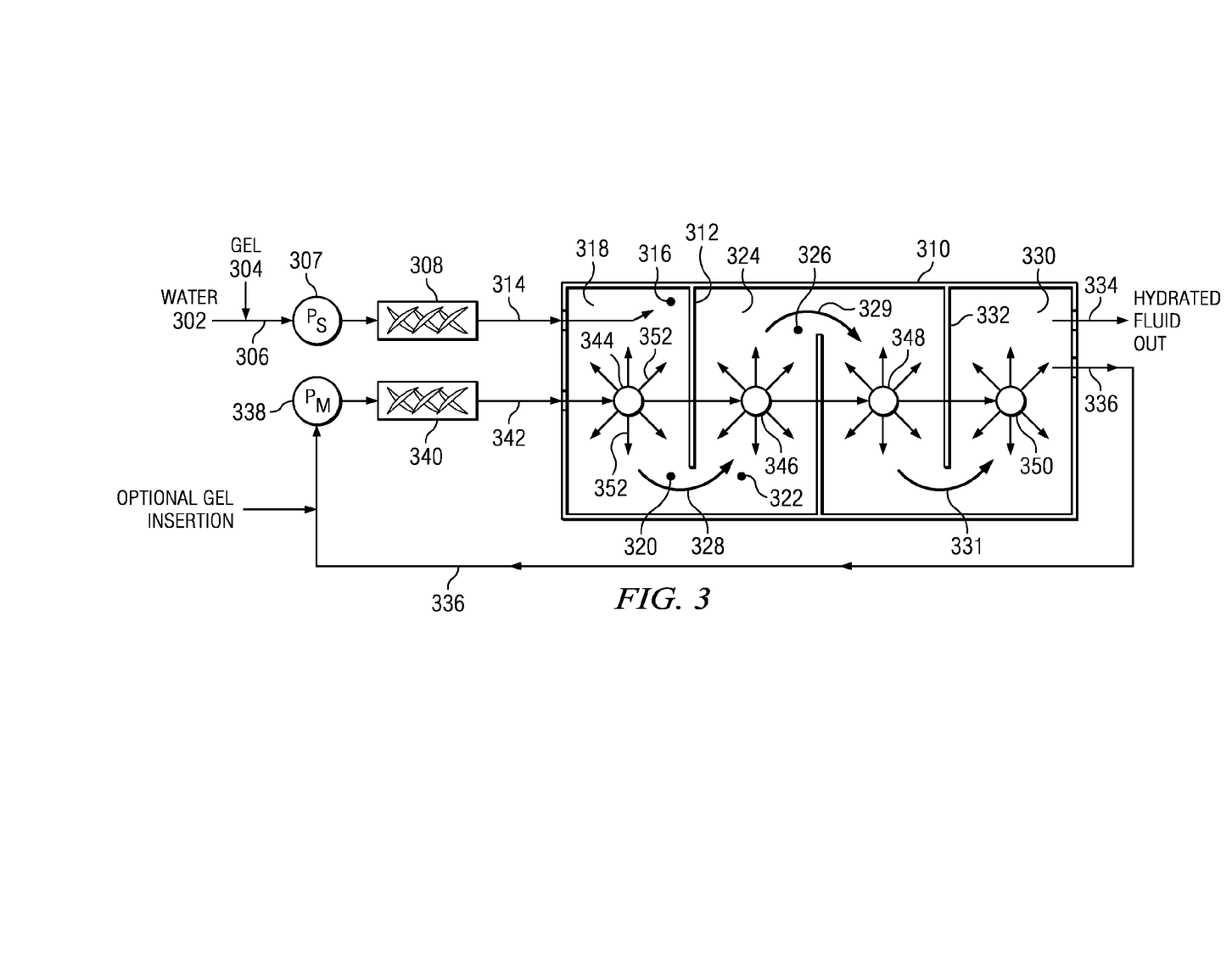
FIG. 3 is a schematic illustration of one embodiment of an exemplary hydration process.

Referring now to FIG. 3, in order to get a better understanding of the process or method used in an exemplary hydration gel unit, a process schematic is provided. As shown water 302 and polymer phase gel 304 are combined into a mixture 306 and provided to a suction pump 307. The suction pump 307 begins the introduction of shear to the polymer phase gel/water mixture 306 as the suction pump's impellers pull and push the mixture 306 through the suction pump 307. The mixture 306 exits the suction pump 307 and is input into a static mixer 308. Additional shear forces are imparted on the mixture as it flows, swirls and spins through the static mixer. Upon exiting the static mixer the mixture, which is becoming hydrated fluid, is input into the hydration tank 310 in a first tank section input area 316.

In this embodiment the hydration tank 310 is divided into N tank sections. Each tank section is adjacent to another tank section and separated from an adjacent tank section via a compartment separator such as compartment separator 312. The compartment separator is a partial wall having a width that does not extend the full width of the hydration tank 310. FIG. 3 is essentially a top view of an exemplary hydration tank 310.

The hydration fluid mixture 314 that is output from the static mixer 308 is distributed into a first input area 316 of the first tank section 318. The hydrated fluid will then flow within the first tank section 318 from the first input area 316 toward the first tank section exit area 320 and then into the second tank section input area 322 of the second tank section 324. The fluid will then flow toward the second tank section exit area 326 in a manner shown by the flow arrows 328, 329 and 331 until it reaches the Nth tank section 330.

FIG. 3 depicts a hydration tank 310 having four tank sections (i.e., N=4). It is understood that an embodiment of the invention may have anywhere from two to N distinct tank sections that are each defined, at least in part by partial compartment separators such as compartment separator 312 or compartment separator 332. In an exemplary embodiment it will take a minimum of about 45 seconds to 1.5 minutes for hydrated fluid to travel from the first input area 316 to either the hydrated fluid output 334 or the hydrated fluid return pipe 336. The minimum of about 45 seconds to 1.5 minutes is necessary for the hydratable polymer phase material in the polymer phase gel to partially hydrate enough to impart a minimum expected viscosity increase in the hydrated fluid that may be output at the hydrated fluid output 334.

Some of the hydrated fluid that arrives in the Nth tank section is extracted from the Nth tank section 330 via a hydrated fluid return pipe 336. The hydrated fluid return pipe 336 recirculates hydrated fluid to a mixing pump 338. The mixing pump 338 may be the same or similar to the suction pump 308 such that the mixing pump 338 is a centrifugal pump which imparts shear forces on the hydrated fluid as it is pumped from the Nth tank section 330 and through the mixing pump 338. At the output of the mixing pump 338 the hydrated fluid is directed toward another static mixer 340 which like the input static mixer 308 spins and/or turns the hydrated fluid to add additional shear forces to the fluid in order to help accelerate the hydration of the hydratable polymer. Upon exiting the static mixer 340, the hydrated fluid flows into the jetting system input 342. The jetting system comprises a jet manifold having a plurality of jet pipes (not specifically shown in this figure) attached to M jet manifold outputs. Each jet pipe has a plurality of jets that output the hydrated fluid in a plurality of directions and levels inside one or more of the N tank sections. FIG. 3 depicts each of the N tank sections having a jet pipe 344, 346, 348 and 350 therein. For example, the first jet pipe 344 is shown to be centrally located in the first tank section 318 wherein a plurality of jets shoot hydrated fluid in a plurality of directions depicted by the arrows 352. The hydrated fluid being jetted into a first tank section 318 is jetted with such force that it creates ample shearing forces on both the hydrated fluid being jetted out each individual jet of the first jet pipe 344 and on the preexisting hydrated fluid/polymer phase gel water mixture in the first tank section 318. The hydrated fluid then moves toward the first section exit area 320 and into the second tank section input area 322 as shown by flow arrow 328.

Again, in the second tank section 324 a second jet pipe 346 jets a plurality of hydration fluid streams into the overall hydration fluid flow moving from the second tank section input area 322 toward the second tank section exit area 326. The second jet pipe 346, without incorporating moving mechanical parts, creates a large shear rate by jetting the recirculated hydration fluid into the hydration fluid that is moving through the second tank section 324. The hydrated fluid moves from the second tank section exit area 326 into the next tank section generally as shown by flow arrow 329. The general flow of the overall hydrated fluid from the first tank section to the Nth tank section is a serpentine, back and forth flow as the hydrated fluid flows from compartment section to compartment section and is jetted, mixed and agitated by the plurality of jets associated with each jet pipe 344, 346, 348, 350 so as to impart significant shear to the hydration fluid and further accelerate the hydration of the polymer phase to thereby increase the viscosity of the hydrated fluid as it moves toward the Nth tank section 330.

In some exemplary embodiments both the suction pump 307 and the mixing pump 338 can move a maximum of about 140 bbl/min. In other embodiments the maximum flow rate may be faster or slower depending on the overall hydration tank volume and the number of tank sections. Since an exemplary hydration tank 310 can hold about 190 bbl, it follows that between the original input of the polymer phase gel water mixture and the recirculation of the hydrated gel via the return pipe and jetting system that the hydrated fluid can move from the first tank section to the hydrated fluid output 334 of the Nth tank's section in a minimum of about 45 seconds to about 1.5 minutes when operating both the suction pump 307 and the mixing pump 338 at or near maximum pumping capability. The combination of the time it takes for the hydrated fluid to travel through the serpentine path of the exemplary hydration tank 310 along with the mixing, agitation and shear magnitude applied to the hydrated fluid creates a hydrated fluid at the hydrated fluid output 334 having a desired viscosity in the given amount of time. Furthermore, when the suction pump 307 is not running at a maximum pumping rate, for example, at a slower rate of 50 to 90 bbl/min, and the mixing pump 338 continues to operate at a maximum pumping rate of about 130 to 160 bbl/min, the hydrated fluid output can be limited to the same or similar bbl/min as the suction pump bbl/min rate via hydration tank output valve 128. This configuration enables the hydrated fluid to recirculate multiple times via the recirculation and jetting system route comprising the return pipe 336 the mixing pump 338 the static mixer 340 and the jetting system, which includes the jet manifold and at least one jet pipe per each of the end tank sections. In some embodiments there are multiple jet pipes in each tank section.

Figure 4:
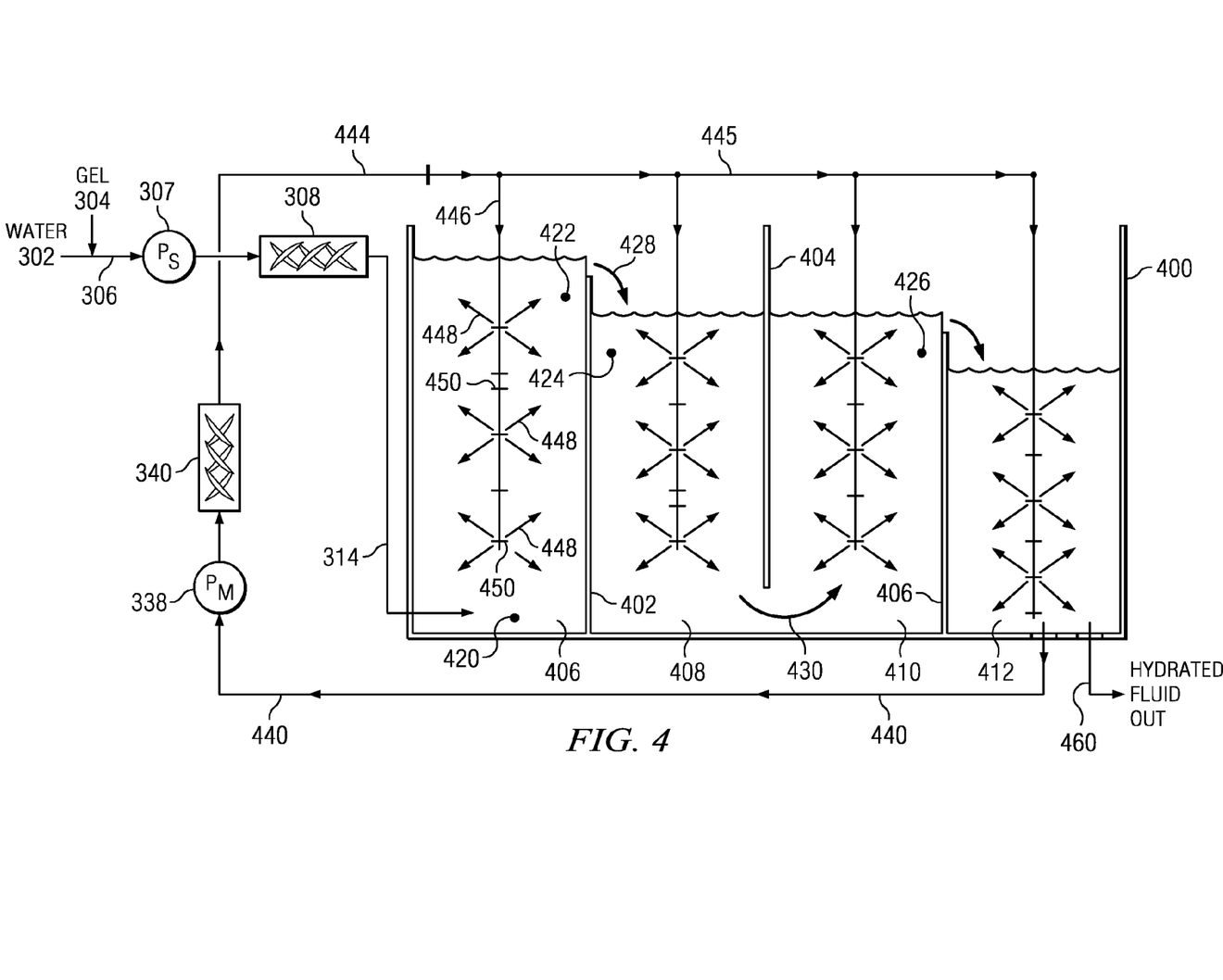
FIG. 4 is a schematic illustration of another embodiment of an exemplary hydration process.

Referring now to FIG. 4, a second embodiment of an exemplary gel hydration unit is depicted in a schematic flow diagram. Like the previous embodiment, water 302 and polymer phase gel 304 are combined into a mixture 306. A suction pump 307 pumps the water gel mixture through an input static mixer 308 and into exemplary hydration tank 400. FIG. 4 depicts a side view flow schematic of the exemplary hydration tank 400 wherein there are N tank sections. Separating or defining each adjacent tank section is a separation wall 402, 404, 406, wherein the first separation wall 402 has a first height extending from the bottom of the hydration tank upward and being attached to both sides of the hydration tank 400 establishing basically a single holding tank section as the first tank section 406. The second tank section separation wall 404 may be considered a baffle wall because the separation wall 404 extends across the width of the hydration tank 400 and from near the top of hydration tank 400 towards the bottom such that there is a spaced gap between the bottom edge of the second separation wall 404 and the bottom of the hydration tank 400 to allow hydrated fluid to flow there through and between. The separation wall 404 separates the second tank section 408 from the third tank section 410. The separation wall 406 separates the third tank section 410 from the fourth or Nth tank section 412. The separation wall 404 is similar to the first separation wall 402, but has a height that is from about one inch to about 1.5 feet lower than the first separation wall 402. Each of the separation walls 402 and 406 extend a different predetermined distance above the bottom of the hydration tank 400. In other embodiments, the separation walls 402, 404 and 406 may be solid walls extending from the bottom to substantially near the top of the hydration tank, but have cut-outs, or cut-away portions at or near the top and bottom of alternating separation walls to allow the hydration fluid to flow substantially in the serpentine manner described herein. Additionally, in other embodiments, one or more of the separation walls may be made completely or in part to be or have a grid, open mesh or screen-like wall that allows hydration fluid to flow there through with some determined amount of restricted flow, but also add additional shear within the hydration tank when certain ones of the hydration fluid jet flows impact the grid or screen-like separation wall.

The mixture 306, which is changing into hydration fluid, enters the first section input area 420 and travels upward to the first section output area 422. At the first section output area 422, the hydration fluid cascades as shown by the flow arrow 428 over the top of the separation wall 402 and into the second section input area 424. The hydrated fluid then travels downward to near the bottom of the second tank section 408 and underneath the second separation wall 404 in a general flow as shown by flow arrow 430 where the hydrated fluid flows upward through the third tank section 410 to the second section output area 426, where it cascades over the separation wall 406 into the next tank section 412. This upward, downward, and then upward general serpentine movement of the hydrated fluid continues until it reaches the bottom of the Nth tank section 412. In exemplary embodiments, movement of the hydrated fluid from the first input area 420 to the bottom of the Nth tank section 412 takes a minimum of about 45 seconds to about 1.5 minutes. A return pipe 440 has an inlet located in the Nth tank section 412 wherein hydrated fluid is returned or recirculated toward a mixing pump 338 and then through a recirculation static mixer 340 adding additional shear in a manner similar to the embodiment explained in FIG. 3. The hydrated fluid exiting the recirculation static mixer 340 is then input into the jetting system input 444. Here, recirculated hydrated fluid is pumped, via the mixing pump 338 into the jetting manifold 445, which has at least one jet pipe output per tank section. The recirculated hydrated fluid is then jetted out a plurality of jets 450, in a plurality of directions, at a plurality of depths within the first tank section. The first jet pipe 446 schematically shows the flow of a plurality of hydrated fluid jets that are jetted in a plurality of directions 448 at a plurality of depths within the first tank section 406. Note that in this embodiment the hydrated fluid already in the tank is flowing upward through the jets 448 where strong shear forces are encountered within the first tank section 406 from the hydration fluid jets 448 before the hydrated fluid cascades in accordance with the flow arrow 428 over the separation wall 402 into the second tank section 408. In the second tank section 408, the second, third and remaining jet pipe jet the recirculated hydrated fluid in a plurality of directions at a plurality of depths within their respective tank sections 408, 410, 412. The plurality of jet directions and jet depths are depicted schematically by arrows. In this embodiment, the general flow of the hydrated fluid is in a downward direction while it is being jetted and sheared in the second tank section 408.

In some embodiments, the first jet pipe may be positioned in the downward general flow of the hydrated fluid in the first tank section 406 (i.e., the mixture 314 is being poured into the top of the first tank section 406. Furthermore, in additional embodiments the jet system manifold may be positioned near or proximate to the bottom of the N tank sections with the jet pipes extending upward (instead of downward) therefrom in each tank section. In other embodiments the jet pipes may extend from one or more jet manifolds that extend along or proximate to one or more of the inner sides of the hydration tank. As the hydrated fluid moves generally in the up and down serpentine fashion from the first tank section 406 to the Nth tank section 412, the jetting of the recirculated hydrated fluid adds significant shear, agitation and mixing to the hydrated fluid thereby accelerating the hydration process, which increases the viscosity of the hydrated fluid at a more rapid rate than with less than or without the significant shearing of the fluid caused from, among other elements of the embodiment, the jetting, agitation and mixing of the hydrated fluid within the N tank sections.

Figure 5:
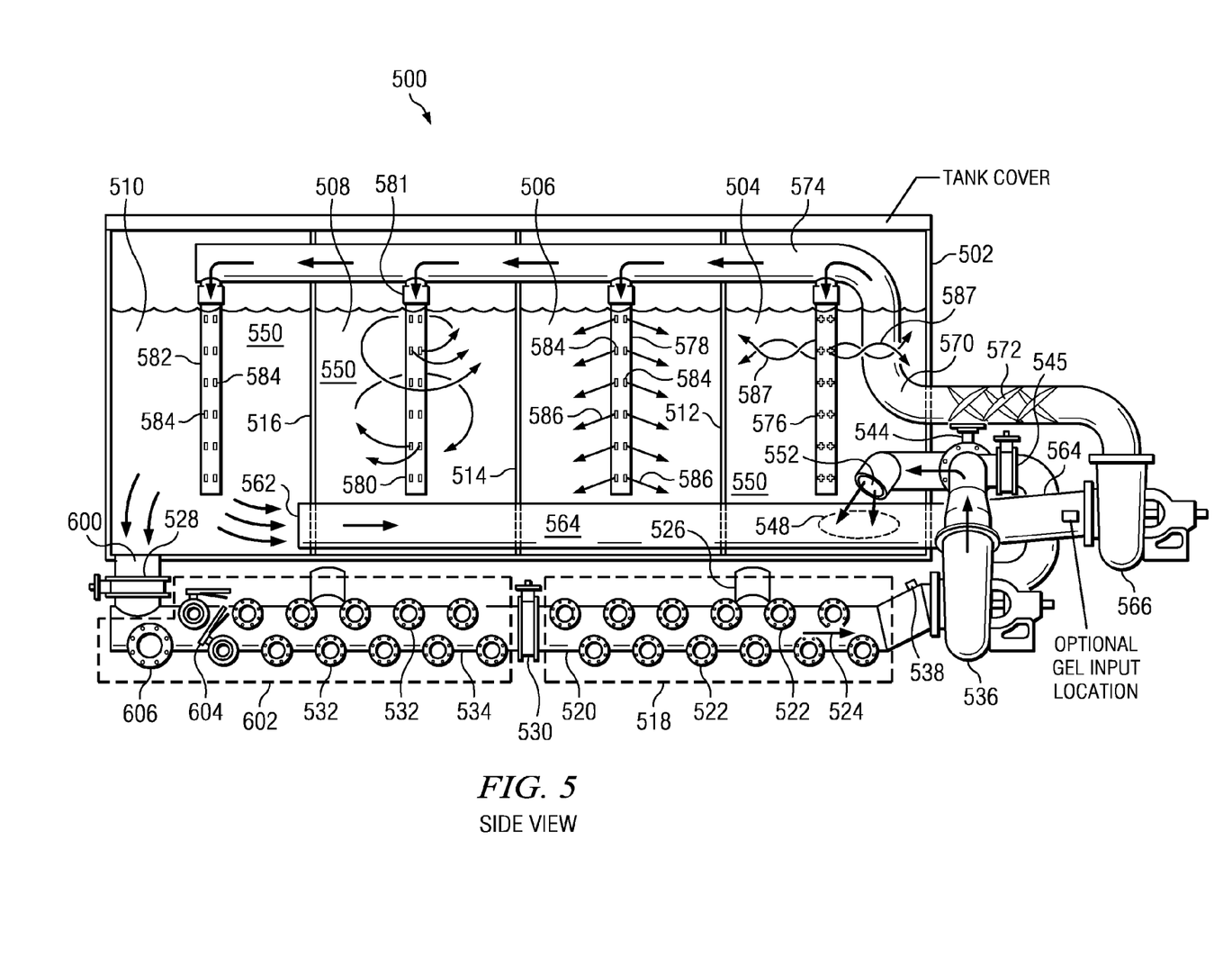
FIG. 5 is a side view drawing of an exemplary hydration unit.
Figure 6:
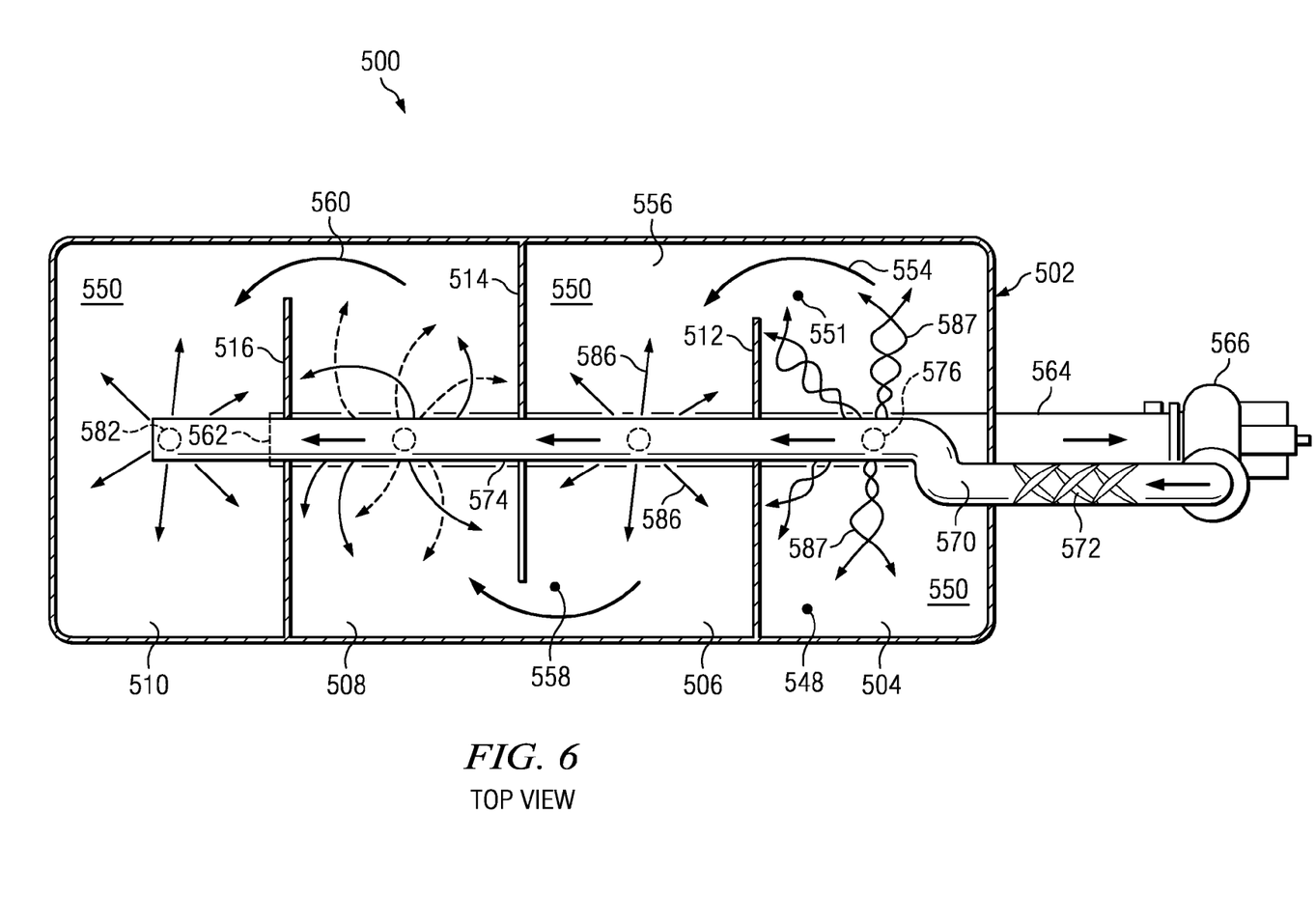
FIG. 6 is a top view drawing of a portion of an exemplary hydration unit.
Figure 7:
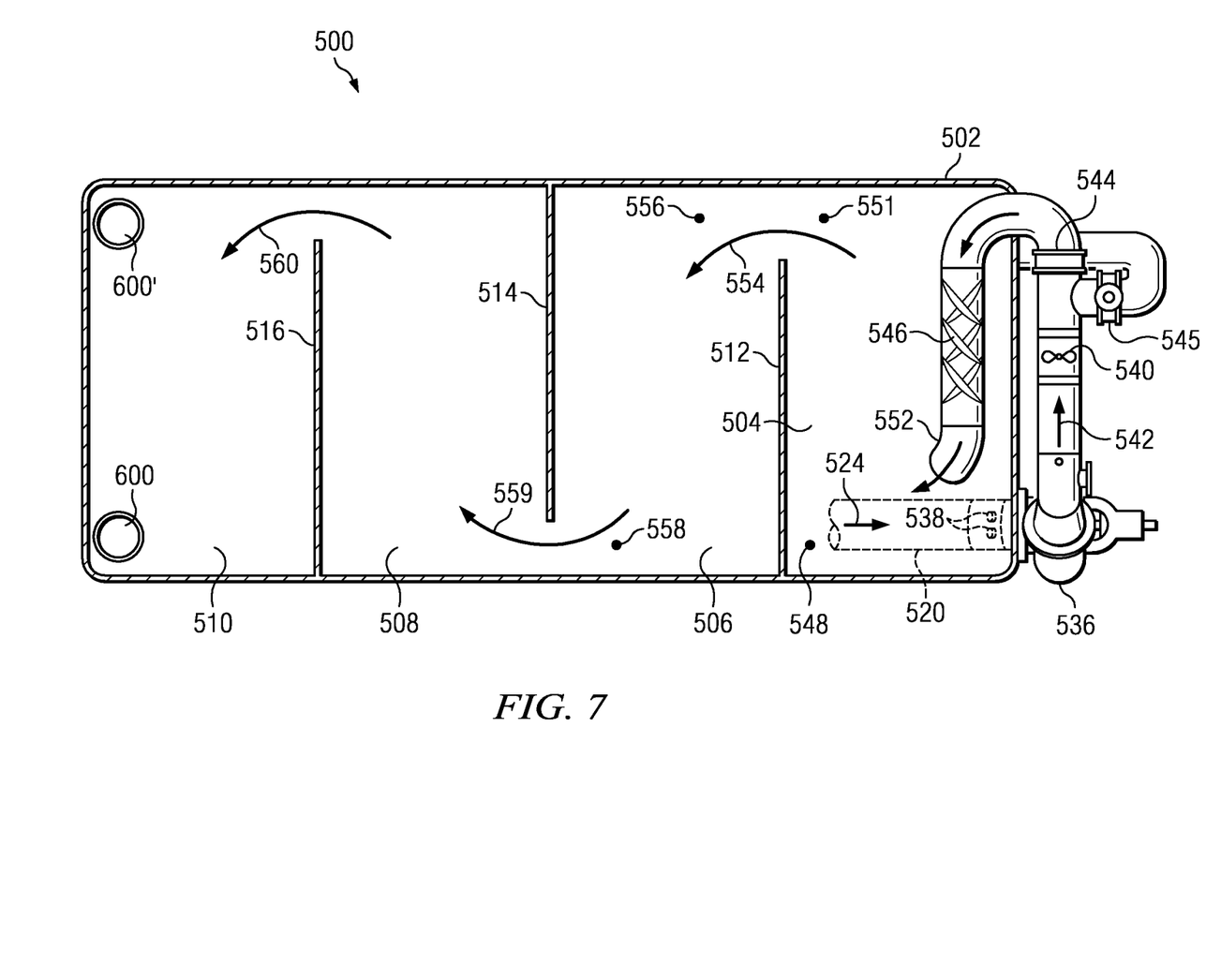
FIG. 7 is a bottom view drawing of a portion of an exemplary hydration unit.

Referring now to FIGS. 5, 6 and 7 a side, top and bottom view of an exemplary gel hydration unit 500 are depicted, respectively. The exemplary hydration unit 500 has a hydration tank 502 that is separated into N tank sections 504, 506, 508, 510 by a plurality of tank section dividers 512, 514, 516 such that each of the N tank sections is adjacent to at least one other tank section within the hydration tank 502. The tank section dividers 512, 514, 516 are each attached along an edge to the bottom of the tank and along a side edge to at least one side of the tank so as to create a passage way for fluid to flow between each tank section 504, 506, 508, 510 and a side wall of the hydration tank 502. External to the hydration tank 502 is a water input section 518. The water input section has a water input manifold portion 520 with the plurality of (in this embodiment 12) water input valves 522. Each water input valve 522 may be attached via a hose to a water or fluid supply. In some embodiments, each water input valve 522 may connect to a four inch diameter hose. If each four inch hose is capable of carrying a maximum flow of about five to ten barrels of fluid per minute then by connecting 12 hoses, one to each water input valve 522, the amount of water that can be input into the water input manifold 520 may range from about 60 to about 120 bbl/min. Some embodiments comprise larger input valves, for example one or more eight inch input valves may be connected to the input manifold 520, which can each carry a maximum fluid flow of from about 36 to 50 bbl/min. Thus, in some embodiments the input manifold 520 may have a water flow input 524 from ranging from zero to about 120 bbl/min. Embodiments may have fewer or additional input valves associated with a single water input manifold 520 that may affect the fluid throughput. Furthermore, a second input manifold may be used via the water input cross pipe 526, which extends and connects to a location on the other side of the hydration tank 502 that provides a second water input manifold (see FIGS. 1 and 2). A water input cross pipe valve (also not specifically shown) may be located between the water input manifold 520 and the second water input manifold at the other end of the cross pipe 526 so as to enable use or non-use of the second water input manifold. Furthermore, if the hydration tank output valve 528 (shown in FIG. 5) is closed and the manifold separation valve 530 is opened, the plurality of output valves 532 on the hydration fluid output manifold section 534 can be used as input valves in association with the water input section 518 so as to increase an amount of water flow in bbl/min into an exemplary gel hydration unit.

The water flows in the direction of the water flow arrow 524 due to the suction pump 536 pulling the water or fluid flow through the one or more water input valves 522 of the water input section 518. The suction pump 536 may be a centrifugal pump or other reasonably comparable pump capable of pumping from about 120 to about 200 bbl/min max. The centrifugal suction pump 536 may be powered by a hydraulic system, electricity or a combustion engine and transmission associated with the exemplary gel hydration unit 500. As the water or fluid is sucked toward the suction pump 536, polymer phase gel is injected through a polymer phase gel input valve 538 at a rate determined by the machine operator and/or the control panel. The polymer phase input valve 538 may include one or more input valves that allow the polymer phase gel to be injected into a central location of the water flow 524 prior to entering the suction pump 536.

The water and polymer phase gel mixture is input on the suction side of the suction pump 536. The impeller of the suction pump 536 imparts initial shear to the water/gel mixture when it flows through the centrifugal pump so as to initiate and expedite the hydration of the hydratable polymer within the polymer phase gel. The initial mixture flows from the output of the suction pump 536 past a flow meter 540, which measures the total flow of the water/polymer phase gel initial mixture to be input into the hydration tank 502. The flow meter 540 provides mixture flow rate 542 information to the control panel computer (not specifically shown) so as to help enable overall control of the gel hydration process. The tank inlet valve 544 is opened while the bypass valve 545 is closed so that the input mixture flow 542 is pumped toward and through the input static mixer 546. The input static mixer 546 spins and mixes the initial input mixture within the pipe prior to its distribution into the hydration tank as hydrated fluid (although at this point the hydrated fluid is only partially hydrated) 550. The hydrated fluid 550 is output into the first tank section 504 via the fluid mixture outlet 552.

The hydrated fluid 550 continues to hydrate as it flows from the first input area 548 through the first tank section 504 and/or the first tank section output area 551, and then between the tank section divider 512 and the hydration tank 502 sidewall 511 as depicted by the hydrated fluid flow arrow 554. The hydrated fluid then enters the second tank's section input area 556 and moves toward the second tank section output area 558, which is on the other side of the second tank section. The hydrated fluid flows in this back and forth serpentine manner through the N tank sections until reaching the Nth tank section as shown by the hydrated fluid flow arrow 559, 560.

The hydrated fluid 550 may then flow into the return inlet 562 of the return pipe 564. The return pipe input 562 is positioned within the Nth tank section 510 proximate to the bottom of the hydration tank 502. The return pipe in this exemplary embodiment is a twelve inch diameter pipe and the hydrated fluid 550 is drawn through the return pipe 564 toward the mixing pump 566. The mixing pump 566 may be substantially similar to the suction pump 536 or may be of an alternate pump design. The mixing pump 566 is used to recirculate the hydrated fluid back into the plurality of N tank sections 504, 506, 508, 510 via the jetting system in order to cause additional significant shear on the hydrated fluid. In some embodiments prior to the recirculated hydrated fluid being pumped into the jetting system input 570, the recirculating hydrated fluid may go through a recirculation static mixer 572 positioned in the fluid line between the output of the mixing pump 566 and the jetting system input 570. Both the recirculation static mixer 572 and the mixing pump 566 provide additional shear to the hydrated fluid flow so as to help increase the hydration rate of a hydratable polymer within the hydrated fluid 550. An exemplary jetting system comprises a jet manifold 574 having M manifold outputs where M jet pipes attach. The M jet pipes 576, 578, 580, 582 each extend into the hydrated fluid 550 that is moving in the back and forth serpentine manner through the N tank sections 504, 506, 508, 510. In some embodiments the jetting system manifold 574 can be from 8-14 inches in diameter.

Each jet tube may be removably attached to the jet manifold 574 via, for example, a Victaulic®, Teekay®, Gruvlok®, or Swagelok® pipe coupling system or clamp, a threaded connection, a weld or other reasonably similar or derivative locking bracket or pipe connection means 581 known to one of ordinary skill in the art. The jet pipes in some exemplary embodiments are six inch diameter pipes and allow hydrated fluid from the manifold 574 into an input side of the jet pipe and out a plurality of jet openings 584 organized about the sides of the tubular length of the jet pipe so as to allow the hydrated fluid to be jetted out of the jets as shown by the jet flow arrows 586 in FIGS. 5 and 6. In the exemplary embodiment shown, each exemplary jet pipe has six levels of jets and six jets 586 or jet openings 584 spaced circumferentially about each jet tube. It has been found through experimentation that the jet openings 584 on the first jet pipe 576 should be from 25% to 100% larger than the jet openings on the Mth jet pipe 582 (in this embodiment the $4^{th}$ jet pipe). It was found that the jet pipe openings should be smaller in first jet pipe 576 than in the Mth jet pipe 582 so that the hydrated fluid being pumped by the mixing pump 566 will be distributing either more evenly between each of the N tank sections or so that more of the hydrated fluid is delivered to the first tank section 502 then, for example, the Nth tank section 510. The distal end of each jet pipe may be closed, or in some embodiments incorporate an additional jet outlet.

Figure 8:
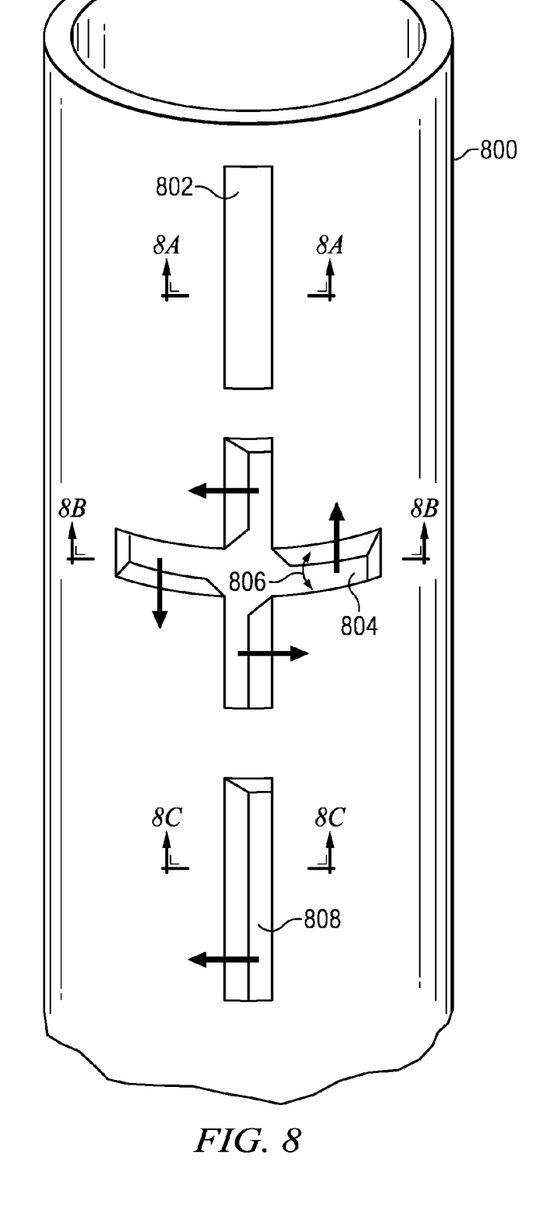
FIG. 8 is a three dimensional drawing of a jet tube having a plurality of jet port configurations.
Figure 8A:
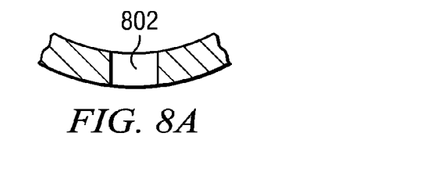
Figure 8B:
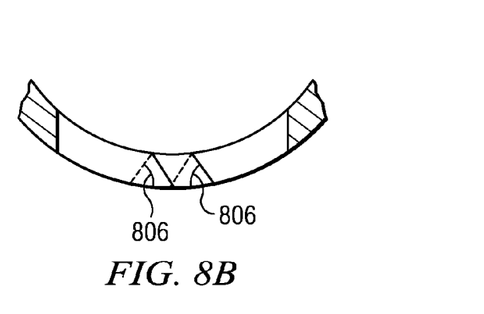
Figure 8C:
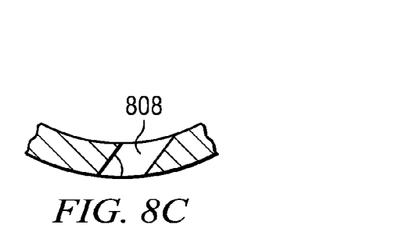

The jet openings 584 may be in the form of slits, circles, ovals and other geometric shapes. Referring for a moment to FIG. 8, an exemplary jet pipe 800 is shown having three different exemplary types of jet openings. The first jet opening is a straight jet slit 802 wherein fluid being jetted out of the slit will be jetted straight out and substantially radially from the outer surface of the jet pipe 800 (see cross-sectional view A). A second exemplary jet shaped configuration is a cross or plus sign shaped jet opening 804 wherein each extension of the cross or plus shape is cut through the jet pipe at a cut angle 806 (shown also in cutaway view B) that is from 30° to about 60° (120°-150°) such that each extension of the exemplary plus or cross shaped jet will direct hydrated fluid so that the jet will spin or spiral out of the plus or cross shaped jet opening 804 that may also be referred to as a quad angled jet opening. A jet pipe with the exemplary quad angle jet 804 is shown as the first jet pipe 576 positioned in the first tank section 504, shown in FIGS. 5 and 6. The spiraling jet stream created by the exemplary quad angle jet 804 is shown as the spiral fluid motion arrows 587 as seen in the first tank section 504 in the top view of FIG. 6. The various jet opening configurations provide varying amounts of additional shear to the turbulent hydration fluid 550 flowing within the plurality of hydration tank sections.

Referring back to FIG. 8, a third exemplary jet opening configuration is depicted as an angled jet slit 808 wherein the slit is made through the outer wall of the jet pipe 800 at an angle that may be 30 to 60° with respect to either a radial line extending from a central axis of the jet pipe 800 or with respect to a tangent of the outer surface of the jet pipe 800. The angled jet slit 800 will jet hydrated fluid in an angular direction about the circumference of the exemplary six inch diameter jet pipe 800. An exemplary angle jet slit 808 can be cut to angle the jet fluid flow to the left or the right so that the jets of, for example the third jet pipe 580 can jet the fluids so that it moves in a clockwise or counterclockwise rotation about the third jet tube 580 as shown in the third tank section 508 in FIGS. 5 and 6.

The jetting of the recirculated hydrated fluid out of the jet pipe jets produces a significant amount of shear between the jetted recirculated hydrated fluid and the hydrated fluid already flowing in each of the N tank sections. It has been found that with a straight jet such as exemplary straight jet 802 shown in FIG. 8 that the jet streams indicated by arrows 586 penetrate and shear all the way through the hydrated fluid already in, for example the second tank section 504, and impacts the inner hydration tank walls as well as the tank section dividers 512 and 514, which creates magnitudes of shear, and does not require moving parts such as paddles, link chains, bearings gears that are subject to wear and breakage, inside the hydration tank 502. Through experimentation it appears that the additional shear created within embodiments of the exemplary gel hydration units accelerate the hydration of the hydratable polymers within the hydrated fluid up to 15 percent faster than various existing mechanical, paddle based hydration units.

During normal operation, the mixing pump 566 can be operated continuously at or near its maximum pumping rate, which in some exemplary embodiments is around 120 to 200 bbl/min. If an exemplary hydration tank 502 holds about 190 to 200 bbl of fluid, then the mixing pump can move or recirculate the entire fluid contents of the hydration tank 502 about once every 0.75 to 1.5 minutes. Furthermore, if the suction pump 536 is pumping the water-polymer phase gel mixture into the first tank section 504 at a slower rate of from about 60 bbl/min to about 100 bbl/min wherein the exemplary hydration tank 502 can hold from about 190 to about 200 bbl of hydrated fluid, it will take the newly inserted hydrated fluid that enters the first tank section 504 about 1 to 1.5 minutes to travel through the back and forth serpentine path while encountering mixing, agitation, and extreme shear from the multiple jets positioned in each of the N tank sections to get to the Nth tank section and be extracted on a continuous basis through the hydration tank outlet 600 or outlets 600, 600'. Much of the hydration fluid being extracted will have circulated through the recirculation system and jets multiple times prior to extraction thereby creating a more hydrated hydration fluid on-the-fly (i.e., continuous) that requires less polymer slurry or polymer phase gel to create.

After exiting the hydration tank 502 via the hydration tank outlet 600, 600', the hydrated fluid passes a hydration tank outlet valve 528 (528') and is delivered into the hydrated fluid output section 602. The hydrated fluid output section has a plurality of output valves 532 that can be connected to a plurality of hoses (not specifically shown) extending from the output valves 532 to, for example, a blender unit. The output valves 532 may each have a manual output valve control 604 so that it can be manually opened or closed by a machine operator. Some embodiments may have a larger diameter output valve 606 that may be an eight inch valve as compared to the exemplary four inch output valves 532. In other embodiments the valves may be further controlled by the control panel.

It has been found in some embodiments that improved hydration of the hydrated fluid occurs when the mixing pump 566 is operated at or near its maximum pumping capacity so that the recirculation of the hydrated fluid and the shear created by the jetting and agitation of the fluid created by the plurality of jets in the jet pipes is maximized. It is further found that although embodiments of the invention work well and produce a uniform and needed hydrated fluid at the hydrated fluid output section when the suction pump 536 is operating at or near its maximum pumping potential, viscous hydration fluid blend that requires up to about 15% less polymer phase gel than pre-existing mechanical paddle based hydration units can be provided when the suction pump 536 is operating at a pumping rate that is at least 25% less than the maximum pumping rate of the mixing pump 566, which recirculates the hydrated fluid.

Figure 9A:
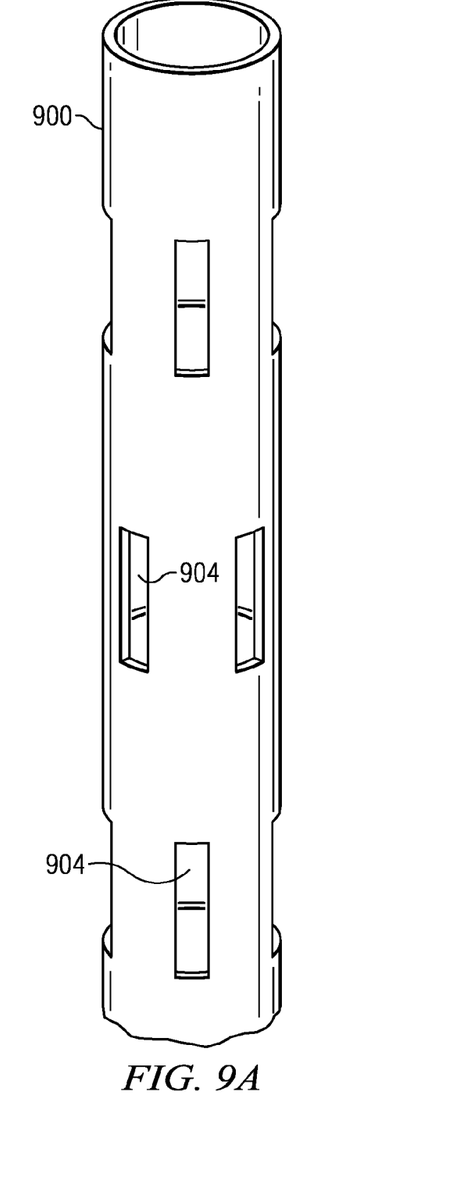
FIGS. 9A and 9B depict jet tube jet position configurations.
Figure 9B:
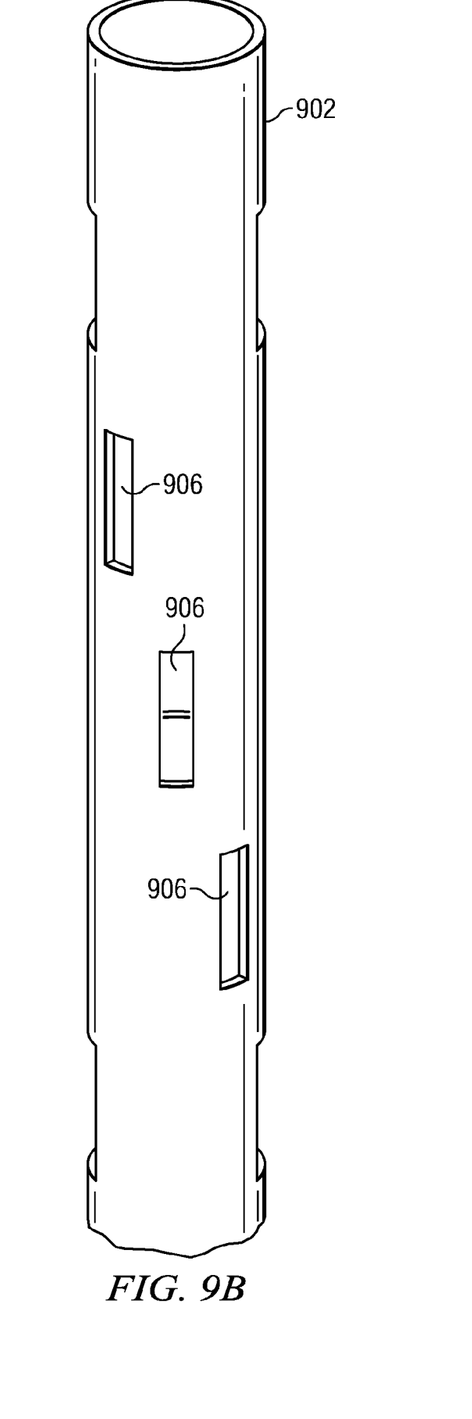

Referring now to FIGS. 9A and 9B it is shown that the jet pipes 900 and 902 may have the plurality of jet openings 904 or 906 respectively configured differently thereon. For example, in FIG. 9A there are multiple levels of jet openings 904, wherein at each level the jet openings are spaced circumferentially about the exemplary jet tube 900. Alternatively, in FIG. 9B the jet openings 906 are configured to spiral circumferentially along the length of the exemplary jet tube 902 thereby creating a helix or double helix jetting configuration. Various other jet position configurations on a jet tube may also be devised by one of ordinary skill in the art.

Many variations and embodiments of the above-described invention and method are possible. Although only certain embodiments of the invention method have been illustrated in the accompanying drawings and described in the foregoing detailed description, it will be understood that the invention is not limited to the embodiments disclosed, but is capable of additional rearrangements, modifications and substitutions without departing from the invention as set forth and defined by the following claims. Accordingly, it should be understood that the scope of the present invention encompasses all such arrangements and is solely limited by the claims as follows.

What is claimed is:

1. A method for rapid hydration of a polymer phase gel comprising:
   providing a polymer phase gel;
   injecting an effective amount of the polymer phase gel into a water stream creating a mixture;
   pumping the mixture of polymer phase gel and water through a first pump so that the mixture goes into a first tank section of N adjacent tank sections;

allowing the mixture of polymer phase gel and water to become a hydrated fluid while moving from the first tank section to the Nth tank;

pumping a portion of the hydrated fluid as recirculated hydrated fluid from the Nth tank section through a second pump and into a jetting system;

jetting, using the jetting system, the recirculated hydrated fluid into at least one of the N adjacent tank sections so as to add sufficient shear to the hydration fluid so as to increase the hydration rate of the hydration fluid; and extracting the hydrated fluid from the Nth tank section.

2. The method of claim 1, further comprising subjecting the mixture to a first static mixer prior to going into the first tank section.

3. The method of claim 1, further comprising subjecting the hydrated fluid to a second static mixer positioned between the second pump and the jetting system.

4. The method of claim 1, wherein the jetting system comprises:
a jet manifold adapted to carry a flow of recirculated hydrated fluid from the second pump; and
a plurality of jet tubes, wherein each jet tube comprises a plurality of jet ports positioned about the jet tube's length.

5. The method of claim 1, wherein a pumping rate of the mixture by the first pump is less than or equal to the pumping rate of the recirculated hydration fluid through the second pump.

6. The method of claim 1, further comprising injecting polymer phase gel into the recirculated hydrated fluid in a location prior to the second pump's fluid input.

7. The method of claim 1 wherein the hydrated fluid moves through at least N−1 tank section before arriving at the Nth tank section.

8. A hydration unit comprising:
a tank adapted to contain hydrated fluid, the tank comprising a first through N adjacent tank sections, each tank section having a fluid inlet area and a fluid output area such that the hydrated fluid moves from the first tank section to the Nth tank section in a general serpentine pattern;
a hydrated fluid return pipe adapted to carry hydrated fluid as recirculated hydrated fluid from the Nth tank section;
a mixing pump adapted to draw recirculated hydrated fluid from the hydrated fluid return pipe and provide the recirculated hydrated fluid to a mixing pump output;
a jetting system adapted to receive the recirculated hydrated fluid pumped from the mixing pump; the jetting system comprising:
a jet tube manifold having M outputs; and
a first jet tube removably attached to a first of the M manifold outputs, the first jet tube extending into the first tank section and adapted to be at least partially submerged in hydrated fluid when present in the first tank section, the first jet tube comprising a first configuration of jet outlets adapted to jet hydrated fluid in a plurality of directions within the first tank section in order impart shear on both the recirculated hydration fluid and the hydration fluid when present in the first tank section; and
a tank hydrated fluid outlet adapted to selectively allow hydrated fluid to exit the tank.

9. The hydration unit of claim 8, further comprising:
a water input section adapted to accept water from at least one water source and provide a water flow path;
a polymer phase gel input valve section adapted to accept a measured flow of polymer phase gel and provide the flow of polymer phase gel into the water flow path to create a mixture of polymer phase gel and water; and
a suction pump adapted to receive the mixture of polymer phase gel and water and to pump the mixture through a fluid mixture output into the first tank section as hydrated fluid.

10. The hydration unit of claim 9, further comprising a static mixer positioned between the polymer phase gel input valve and the fluid mixture output.

11. The hydration unit of claim 9, wherein the combination of the suction pump and the N adjacent tank sections are adapted to enable hydrated fluid to move from the first tank section to the Nth tank section in an amount of time greater than about 0.75 to 1.5 minutes.

12. The hydration unit of claim 9, wherein the suction pump is adapted to pump the mixture into the first tank section as hydrated fluid at a first flow rate that is substantially equal to or less than a selected flow rate that the hydrated fluid exits the tank hydration fluid outlet.

13. The hydration unit of claim 12, wherein the mixing pump provides the recirculated hydrated fluid to the jetting system at a flow rate that is equal to or greater than the first rate.

14. The hydration unit of claim 8, further comprising a static mixer positioned between the mixing pump output and the jetting system.

15. The hydration unit of claim 8, wherein the tank hydrated fluid outlet is located in the Nth tank section.

16. The hydration unit of claim 8, wherein the hydration unit is adapted to be mounted on a vehicle or trailer.

17. A hydration device comprising:
an input section adapted to receive a fluid;
a polymer phase input section wherein a polymer phase gel is combined with the fluid to create a mixture;
a first pump adapted to pump the mixture into a first tank section of a hydration tank as a hydrated fluid at a first selected flow rate, the hydration tank being divided into a plurality of tank sections comprising the first tank section, the plurality of tank sections being adjacent to each other and establishing a hydrated fluid flow path from the first tank section to a last tank section of the plurality of tank sections;
a hydrated fluid recirculation route adapted to extract hydrated fluid from the last tank section and to pump the extracted hydrated fluid through a jetting system at a recirculation flow rate, the jetting system comprising:
a jet manifold adapted to provide the extracted hydrated fluid to a plurality of jet manifold outlets; and
a plurality of jet pipes, each jet pipe connected to one of the plurality of jet manifold outlets so as to extend into a different one of the plurality of tank sections, each jet pipe being adapted to receive the extracted hydrated fluid from the jet manifold and output a plurality of extracted hydrated fluid jets into a respective one of the plurality of tank sections; and
a hydrated fluid tank outlet adapted to allow a flow of hydrated fluid to exit the hydration tank at a selected exit flow rate.

18. The hydration device of claim 17, wherein the selected exit flow rate is adapted to be substantially equal to or less than the first selected flow rate.

19. The hydration device of claim 17, wherein the recirculation flow rate is adapted to be substantially equal to or greater than the first determined flow rate.

20. The hydration device of claim 17, wherein at least one of the plurality of jet pipes comprises one or more jet openings that are configured differently than the jet openings on another one of the plurality of jet pipes.

* * * * *